United States Patent
Ford

(10) Patent No.: US 8,320,702 B2
(45) Date of Patent: Nov. 27, 2012

(54) SYSTEM AND METHOD FOR REDUCING SPECULAR REFLECTION

(75) Inventor: Brian Paul Ford, Cicero, NY (US)

(73) Assignee: JADAK Technologies, Inc., Liverpool, NY (US)

(*) Notice: Subject to any disclaimer, the term of this patent is extended or adjusted under 35 U.S.C. 154(b) by 1069 days.

(21) Appl. No.: 11/536,248

(22) Filed: Sep. 28, 2006

(65) Prior Publication Data

US 2008/0080785 A1   Apr. 3, 2008

(51) Int. Cl.
*G06K 9/40* (2006.01)

(52) U.S. Cl. .......... 382/275; 348/222.1; 348/576; 356/614; 382/117; 382/167

(58) Field of Classification Search .......... 382/275
See application file for complete search history.

(56) References Cited

U.S. PATENT DOCUMENTS

| | | | | | |
|---|---|---|---|---|---|
| 5,387,930 | A | * | 2/1995 | Toh | 348/222.1 |
| 5,748,764 | A | * | 5/1998 | Benati et al. | 382/117 |
| 5,942,762 | A | * | 8/1999 | Hecht | 250/556 |
| 6,193,157 | B1 | * | 2/2001 | Dickson et al. | 235/462.01 |
| 6,379,058 | B1 | * | 4/2002 | Petteruti et al. | 400/76 |
| 6,407,777 | B1 | * | 6/2002 | DeLuca | 348/576 |
| 6,728,401 | B1 | * | 4/2004 | Hardeberg | 382/167 |
| 6,832,729 | B1 | * | 12/2004 | Perry et al. | 235/472.01 |
| 7,144,119 | B2 | * | 12/2006 | Seul et al. | 353/69 |
| 7,599,577 | B2 | * | 10/2009 | Ciuc et al. | 382/275 |
| 2002/0150306 | A1 | * | 10/2002 | Baron | 382/275 |
| 2005/0011957 | A1 | * | 1/2005 | Attia et al. | 235/462.46 |
| 2007/0081168 | A1 | * | 4/2007 | Johnston | 356/614 |

* cited by examiner

*Primary Examiner* — Tsung-Yin Tsai
(74) *Attorney, Agent, or Firm* — David L. Nocilly; Bond Schoeneck & King

(57) ABSTRACT

An imaging unit programmed to reduce specular reflection in a captured image and improve the interpretation of decodable information within the image. The imaging unit is programmed to scan a predetermined region within the image that is susceptible to specular reflection, evaluate the pixel values within the region against a threshold value that is representative of specular reflection, and then replace the pixel value found to represent specular reflection with replacement pixel values that do not corrupt interpretation of the decodable information in the predetermined region. The threshold value and replacement values may be determined on an ad hoc basis and stored in local memory, or calculated for each captured image.

15 Claims, 4 Drawing Sheets

SYSTEM AND METHOD FOR REDUCING SPECULAR REFLECTION

BACKGROUND OF THE INVENTION

1. Field of the Invention

The present invention relates to image capture and data collection systems and, more specifically, to a system and method for reducing specular reflection in optical images to be interpreted and decoded.

2. Description of the Related Art

Specular reflection, or glare, often presents a problem during the interpretation of images captured by automatic identification systems, such as bar code scanners or vision processing devices. Conventional methods of reducing specular reflection involve sophisticated systems having multiple light sources and/or imagers. For example, some systems use an array of mirrors for selecting specific wavelengths of light and a detector having two charged coupled devices (CCDs) tuned to different wavelengths to take two images of a target. The detector is programmed to selectively buffer the image data and correct for any specular reflection using information obtained from both CCDs. These systems, however, require additional hardware and strategic positioning of the illumination source for proper functioning and are therefore costly and time consuming to implement.

BRIEF SUMMARY OF THE INVENTION

It is therefore a principal object and advantage of the present invention to provide a simple system and method for reducing specular reflection.

It is an additional object and advantage of the present invention to provide a less costly system and method for reducing specular reflection.

It is a further object and advantage of the present invention to provide a less intrusive system and method for reducing specular reflection In accordance with the foregoing objects and advantages, the present invention comprises an optical imager that has been programmed to reduce specular reflection (i.e., glare) in a captured image to reduce the negative impact of the specular reflection on image interpretation. Specular reflection in reduced by reviewing the image to be decoded on a pixel-by-pixel basis and looking at the value of each pixel in the area of interest. If the amplitude of the pixel value is greater than a threshold, the pixel value is replaced with a predetermined value that may be fixed, computed via a calibration process, or dynamically determined from frame to frame. The predetermined value may be selected by using a weighted sum of pixels around the current pixel or another image processing technique to reduce noise in the area of interest. The image produced by this process will have no values greater than the threshold and may thus be more easily decoded by barcode decoding or image processing algorithms.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 1:
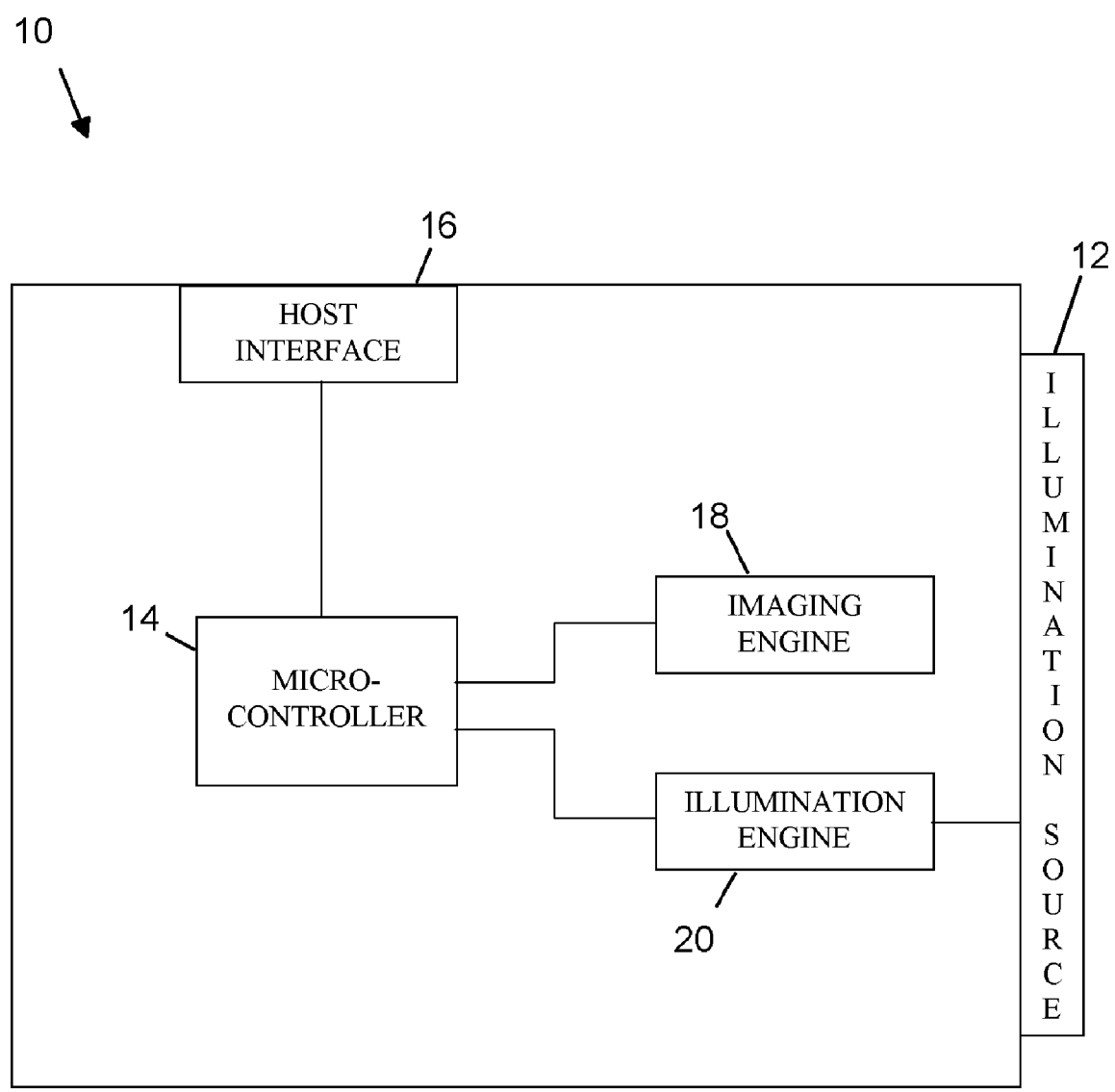
FIG. 1 is schematic of an optical imager according to the present invention.

Referring now to the drawings, wherein like reference numerals refer to like parts throughout, there is seen in FIG. 1, an imaging unit 10 according to the present invention, Imaging unit 10 preferably includes an on-board illumination source 12 comprising one or more light emitting diodes (LEDs) of various wavelengths, to provide illumination of a target (not shown) to be imaged and interpreted. Alternatively, illumination source 12 may be separately attached to imaging unit 10 and positioned proximately thereto.

Imaging unit 10 further includes a microcontroller 14 for managing imaging and illumination operations, performing processing of captured images, and communicating with a remote device, such as a host computer, if desired. For example, imaging unit 10 may include a host interface 16, such as a conventional RS232 transceiver and associated 12 pin FFC jack. Alternatively, interface 16 may comprise other conventional buses, such as USB, IEEE, 1394, IrDA, PCM-CIA, or Ethernet (TCP/IP). Interface 16 may also comprise a wireless transceiver for wireless communication to a host computer and is programmed with the applicable protocols for interfacing with a host computer, such as Bluetooth(r) or 802.11 protocols.

Microcontroller 14 is interconnected to an imaging engine 18 for optically imaging a target object (not shown) and forming corresponding electrical image data. Microcontroller 14 is also interconnected to an illumination engine 20 for controlling the timing and illumination of illumination source 12 during imaging operations. Optionally, imaging engine 18 and illumination engine 20 may be provided as a single unit interconnected to microcontroller 14.

Imaging unit 10 may comprise an IT4X10/80 SR/SF or IT5X10/80 series imager available from Hand Held Products, Inc. of Skaneateles Falls, N.Y. The IT5X10/80 series imager is a CMOS-based decoded output engine that has image capture capabilities via a 12-bit A/D converter. Imaging unit 10 obtains an optical image of the field of view and uses preprogrammed algorithms to decipher the contents of the image. For example, imaging unit 10 may be programmed to capture and interpret two-dimensional images of 1D linear barcodes, 2D stacked/matrix barcodes, standard optical character recognition (OCR) fonts, Reduced Space Symbology (RSS) barcodes, and postal barcodes. Imaging unit 10 may also provide captured images for use in a wide range of applications, such as image and shape recognition, signature capture, image capture, and non-standard optical character recognition.

Microcontroller 14 may comprise a MC9328MXL VH15 microprocessor, available from Freescale Semiconductor, Inc. of Chandler, Ariz., that is programmed prior to implementation in imaging unit 10, or programmed anytime thereafter, such as by using interface 16 to upgrade the firmware used for microcontroller 14. As will be explained hereinafter, imaging unit 10 may be programmed to reduce specular reflection on the target, thereby improving the interpretation of information, such as a barcode, within the image field.

Figure 2:
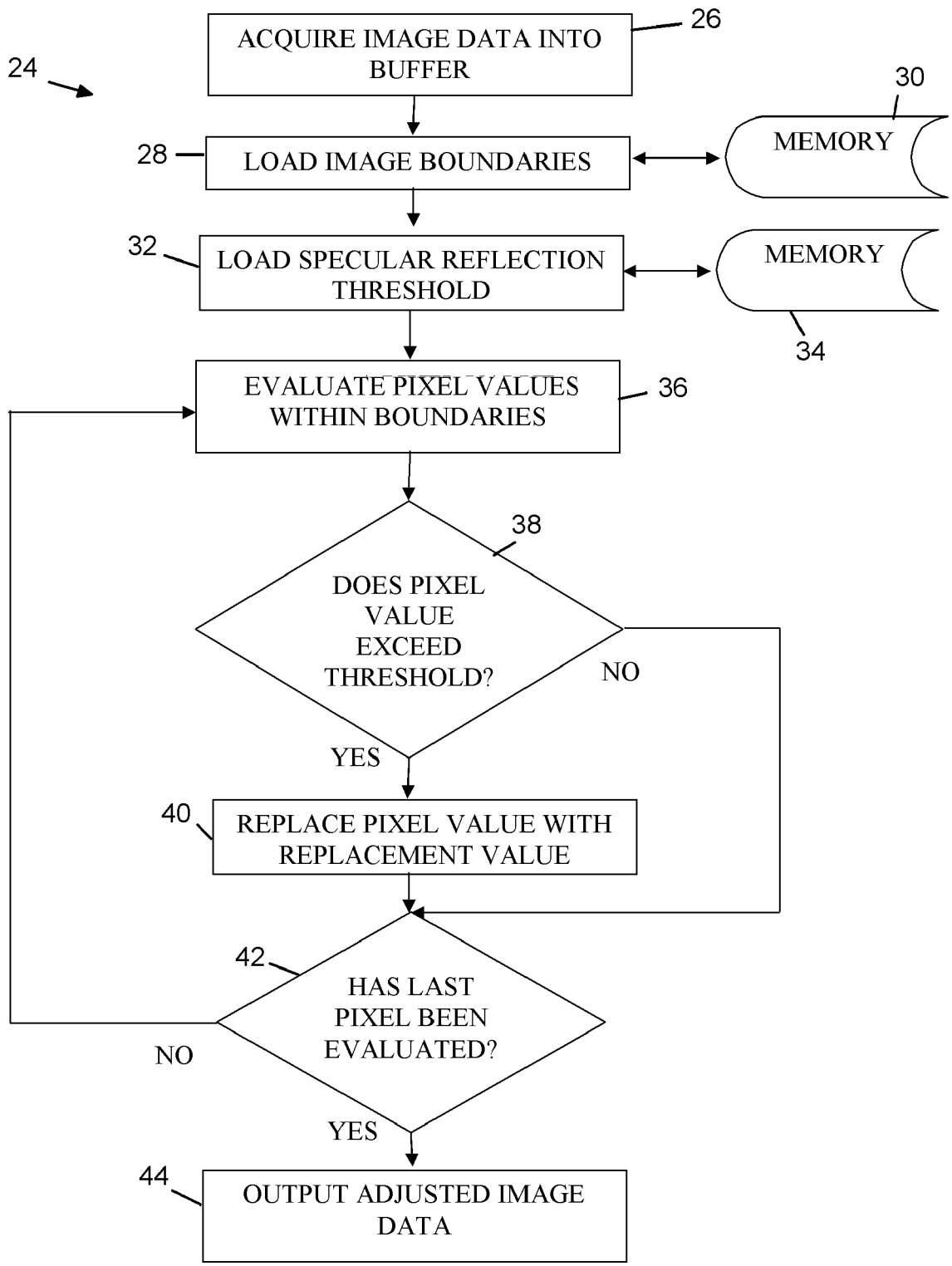
FIG. 2 is a flowchart of a method of reducing specular reflection according to the present invention.

Referring to FIG. 2, imaging unit is programmed to perform specular reduction process 24 on images that are captured. Specular reduction process 24 begins after image data is captured into a buffer 26. The boundaries for the area to be processed are then loaded 28. The boundaries are preferably predetermined based on the image to be captured, stored in memory 30 and then retrieved. After the boundaries are loaded 28, the specular reflection threshold 32 is loaded, preferably from memory 34. The specular reflection threshold 32 is a predetermined pixel value within the image that will be treated as specular reflection and reduced according to the present invention. As with the boundaries 28, the specular reflection threshold 32 is preferably predetermined based on the characteristics of the object to be imaged and the resulting image, such as one captured during a test. After retrieving the boundaries threshold 28, specular reduction process 24 then begins a systematic routine where each pixel values within the predetermined boundaries is evaluated 36. If a check 38 of a pixel value within the boundaries exceeds the threshold, the pixel value is replaced with a predetermined replacement value 40, such as zero (i.e., black). Another check 42 is then performed to determine whether the last pixel within the boundaries has been evaluated and if, so, the adjusted image data is output 44. If not, process 24 returns to step 36 and continues to evaluate pixel values within the boundaries.

Figure 3:
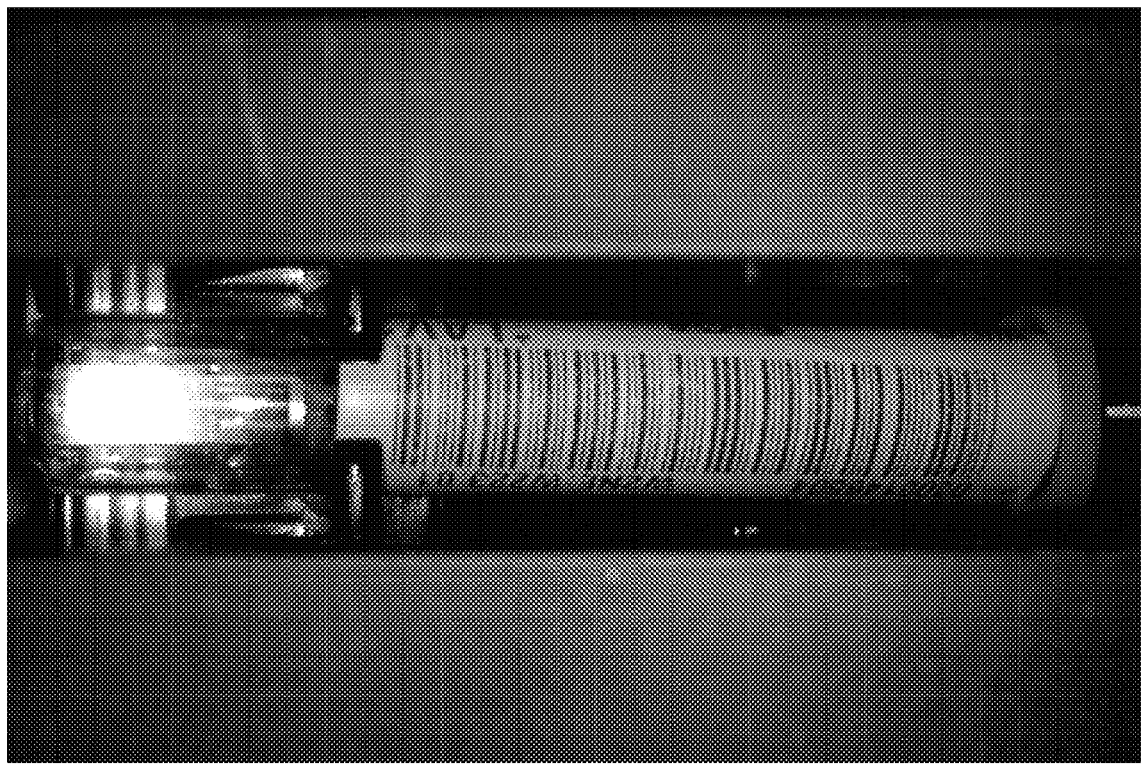
FIG. 3 is an image of a target object affected by specular reflection.
Figure 4:
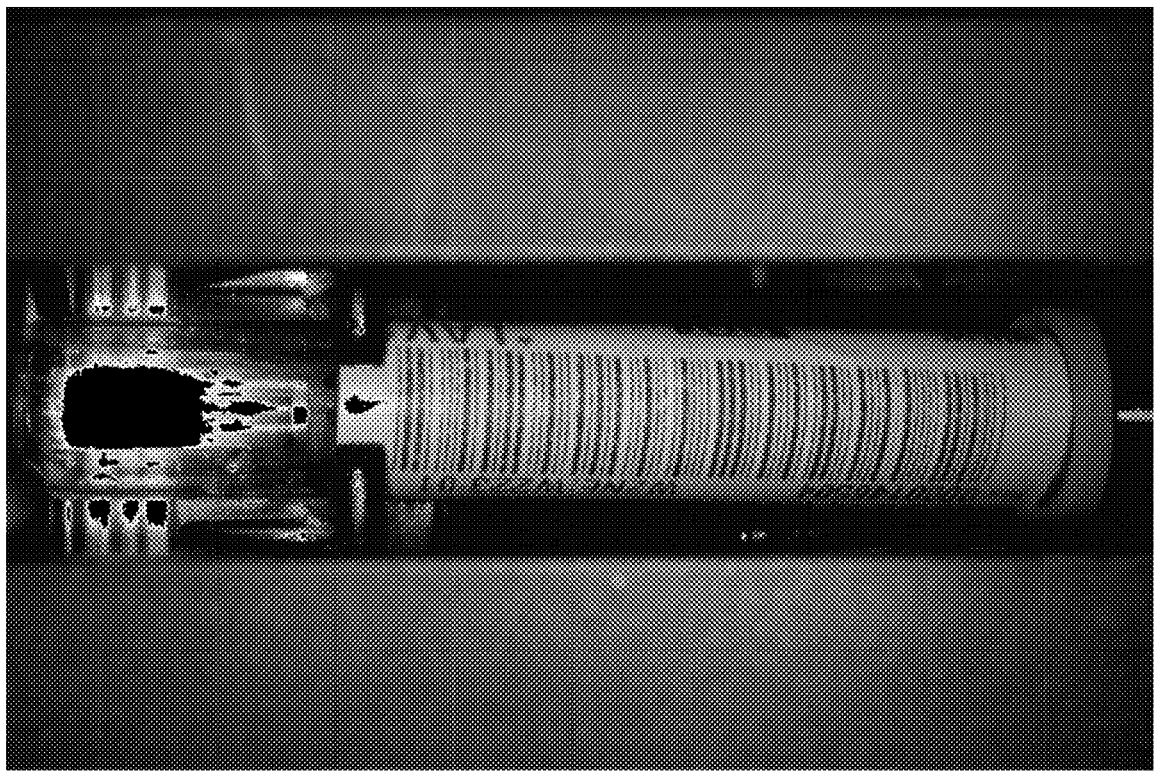
FIG. 4 is an image of a target object after processing according to the method of reducing specular reflection according to the present invention.

As seen in FIG. 3, specular reflection in one region of a digital image of an object captured using an optical imaging unit 10 according to the present invention distorts the overall image and adversely affects the interpretation of information contained in the image, such as the barcode. As seen in FIG. 4, the implementation of specular process 24 using a replacement value of zero eliminates the glare that adversely affects the interpretation of the barcode and allows for decoding of the information where otherwise impossible.

Specular reflection threshold 32 may be determined through a variety of methods. For example, specular reflection threshold 32 may be a fixed number determined through experimentation and configured into unit 10. Alternatively, specular reflection threshold 32 may be set by testing unit 10 prior to operation and allowing unit 10 to calibrate and set the most effective specular reflection threshold 32 for actual use. Finally, specular reflection threshold 32 may be implemented dynamically and determined from frame to frame as unit 10 captures images.

Whether unit 10 is precalibrated or set for dynamic application of specular reflection threshold 32, a histogram of all pixel values in a predetermined region such as the region defined by boundaries 28. The most frequently occurring pixels that are within ten percent of the maximum pixel value may then be thresholded. The sensitivity of unit 10 may be adjusted by varying the ten percent figure as needed. We can adjust the sensitivity of the system by adjusting that 10% number as needed.

For example, where $X_1, X_2, Y_1, Y_2$ represents that pixel coordinates defining the region and MaxPixelValue is the maximum amplitude of a pixel (i.e., the most saturated pixel) in the region, the maximum pixel value and specular reflection threshold are defined as:

$$\text{MaxPixelValue} = \text{MAX}(X_1, X_2, Y_1, Y_2)$$

$$\text{Threshold} = 0.90 * \text{MaxPixelValue}$$

Once these two values are computed, the calculations are iterated across the entire region of interest and the amplitude of any pixel above the threshold is modified to be zero (black). This process may be implemented after acquisition of a test image using various percentages. Unit 10 may then be calibrated by storing the most effective parameters in memory for application to every subsequent image captured by unit 10. Alternatively, this process may be implemented dynamically each time that an image is captured by unit 10.

What is claimed is:

1. A method of reducing specular reflection, comprising the steps of:

acquiring a single optical image of a target object using a single imager, wherein said single optical image includes a plurality of pixel values;

setting boundaries in said single optical image that define a region where specular reflection will be reduced, wherein said boundaries are retrieved from a memory source accessible by said single image;

evaluating each of said plurality of pixel values within said region of said single optical image to determine the maximum pixel value in said region;

setting a threshold pixel value based upon a percentage of said maximum pixel value;

evaluating each of said plurality of pixel values within said region of said single optical image to determine whether each of said pixel values exceed said threshold pixel value;

replacing each of said pixels values of said single optical image that exceed said threshold pixel value with a replacement value; and decoding any encoded information in said single optical image.

2. The method of claim 1, wherein said replacement value is zero.

3. The method of claim 1, wherein the threshold pixel value is ninety percent of the maximum value of the pixels.

4. The method of claim 1, further comprising the step of outputting the optical image after replacement of said pixel values that exceed said threshold pixel value.

5. The method of claim 4, wherein said optical image is stored in a buffer.

6. The method of claim 5, wherein said threshold pixel value and said replacement value are stored in memory.

7. A system for reducing specular reflection, comprising:

a single imager for capturing a single optical image including decodable information and outputting electronic data representing a plurality of pixel values within the single optical image;

a microcontroller interconnected to said optical imager for receiving said plurality of pixel values, wherein said microcontroller is programmed to retrieve a set of boundaries from a memory source accessible by said microcontroller, to define a region of interest in said single optical image based upon said set of boundaries, to evaluate the pixel values falling within said region of interest to determine the maximum pixel value, todynamically determine a threshold based upon said maximum pixel value, to replace any of said plurality of pixel values of said single optical image that exceed said threshold value with a predetermined replacement value, and to decode any encoded information in said single optical image.

8. The system of claim 7, wherein said replacement value is zero.

9. The system of claim 7, wherein said threshold value and said replacement value are stored in memory.

10. The system of claim 9, further comprising an illumination source positioned proximately to said imager.

11. The system of claim 10, wherein said imager, said illumination source, and said microcontroller are housed within a single unit.

12. The system of claim 11, wherein said imager includes a single charged coupled device.

13. The system of claim 12, wherein said decodable information comprises a bar code.

14. The system of claim 7, wherein the threshold pixel value is ninety percent of the maximum value of the pixels.

15. The system of claim 7, wherein the threshold value is calibrating by capturing said single optical image, applying a series of threshold values, and selecting the threshold value that reduces specular reflection the most.

\* \* \* \* \*